United States Patent Office 2,931,788
Patented Apr. 5, 1960

2,931,788

POLYMERS OF A VINYLPHENYL BORONIC ESTER

Arthur K. Hoffmann, Stamford, and Walter M. Thomas, Noroton Heights, Conn., assignors to American Cyanamid Company, New York, N.Y., a corporation of Maine No Drawing. Application September 6, 1957
Serial No. 682,326

15 Claims. (Cl. 260—63)

This invention relates to the production of new materials having valuable and characteristic properties for use in industry, for example, in molding, coating, laminating, impregnating, textile-treating and adhesive applications, as neutron absorbers, gelling agents, metal-ion sequestering agents, and for other purposes. More particularly, the invention is concerned with polymers (both linear and cross-linked polymers) of a vinylphenyl boronic ester (that is, an ester of a vinylphenyl boronic acid or anhydride).

The term "a polymer" as used generically herein and in the appended claims with reference to a vinylphenyl boronic ester (or equivalent wording as set forth above) includes within its meaning both homopolymers and copolymers of a vinylphenyl boronic ester, for instance copolymers of a vinylphenyl boronic ester with a compound which is different from the said ester, is copolymerizable therewith and which contains a single $CH_2=C<$ grouping or a plurality of $CH_2=C<$ groupings, e.g., styrene, dimethylstyrene, methyl acrylate, methyl methacrylate, ethyl methacrylate, vinyl acetate, acrylonitrile, acrylamide, diallyl phthalate, triallyl citrate, tetrallyl silane, etc. The scope of the invention also includes method features whereby new and useful synthetic compositions are produced.

The term "a vinylphenyl boronic acid" as used generically herein and in the appended claims includes within its meaning both the pure or substantially pure individual o-, m- and p-isomers of a vinylphenyl boronic acid (including the anhydride form), as well as any two or all three of the aforementioned isomers in any proportions.

Esters of the vinylphenyl boronic acids used in making the polymers of this invention include, but are not limited to, esters represented by the following general formula I
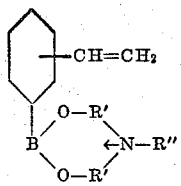

wherein R′ represents an alkylene radical containing from 2 to 7 carbon atoms, inclusive, and R″ represents a member of the class consisting of hydrogen and hydrocarbon radicals containing from 1 to 7 carbon atoms, inclusive; and esters represented by the following general formula:

II
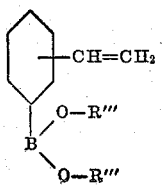

wherein R′″ represents a member of the class consisting of hydrocarbon and halogenated hydrocarbon radicals.

(The phenyl radical represented, for purpose of simplicity, by the symbol

III
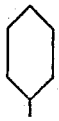

in Formulas I and II also is frequently represented by the symbol

IV

in order to indicate the aromatic unsaturation; and, hence, the latter symbol could be substituted, if desired, for the symbol used for the phenyl radical in Formulas I and II.)

Illustrative examples of radicals represented by R′ in Formula I, that is, of alkylene (including cycloalkylene) radicals containing from 2 to 7 carbon atoms, inclusive, are: ethylene, propylene (trimethylene), butylene, isobutylene, the various pentylenes (including the normal and isomeric pentylenes), hexylenes (both normal and isomeric forms) and heptylenes including both the normal heptylene and the various isomeric heptylenes; also, cyclopentylene, cyclohexylene and cycloheptylene.

Illustrative examples of hydrocarbon radicals represented by R″ in Formula I, that is, of hydrocarbon radicals containing from 1 to 7 carbon atoms, inclusive, are: alkyl (including cycloalkyl), alkenyl (including cycloalkenyl), aralkyl, aryl, alkaryl and alkenylaryl radicals containing from 1 through 7 carbon atoms. More specific examples of such radicals are methyl, ethyl, propyl to heptyl, inclusive (both normal and isomeric forms), cyclopentyl, cyclopentenyl, cyclohexyl, cyclohexenyl, cycloheptyl, benzyl, phenyl, tolyl, vinyl, allyl, methallyl, propenyl, isopropenyl (beta-allyl), 1-butenyl, 2-butenyl (crotyl), 3-butenyl, pentenyl, hexenyl, heptenyl, butadienyl, etc.

Illustrative examples of hydrocarbon and halogenated hydrocarbon (halohydrocarbon) radicals represented by R′″ in Formula II are the same hydrocarbon radicals mentioned above with respect to the definition of R″ in Formula I and the partly halogenated and perhalogenated forms thereof, that is, partly or completely chlorinated, brominated, iodinated or fluorinated forms thereof and where the halogen is the same or different in the individual radical; and also those hydrocarbon and halohydrocarbon radicals that contain more than 7 carbon atoms such as, for example: octyl to octadecyl, inclusive (both normal and isomeric forms), phenylethyl, phenylpropyl, phenylisopropyl, phenylallyl, biphenylyl or xenyl, naphthyl, xylyl, ethylphenyl, propylphenyl, isopropylphenyl, butylphenyl, vinylphenyl, allylphenyl, phenylallyl, phenylmethallyl and other higher alkenylaryl radicals, octenyl to octadecenyl, inclusive, octadienyl, and the corresponding halo-(chloro-, bromo-, iodo- and fluoro-)hydrocarbon radicals, including the partly halogenated and perhalogenated forms thereof, and wherein the halogen is the same or different in the individual radical. The halogen may be in an aliphatic grouping or in an aromatic grouping or in both such groupings when the radical contains both aromatic and aliphatic groupings.

The polymers of this invention can be produced in both linear and cross-linked form. They can be partly or substantially completely hydrolyzed. Many of the hydrolyzed polymers are capable of undergoing reversible cross-linking. For example, a cross-linked polymeric ester of the invention can be hydrolyzed to yield a linear polymeric hydrolysis product; and the latter, in turn, can be cross-linked merely by heating. Furthermore, whereas most poly-(vinylphenyl) compounds, by which is meant specifically polystyrenes, have a softening point within the range of about 90° to 110° C., in marked contrast the homopolymeric and many of the copolymeric vinylphenyl boronic esters of this invention have substantially higher softening points; in fact, many of them do not soften below about 300° C.

It is one of the primary objects of the present invention to provide a new class of polymers, including both homopolymers and copolymers, for use in industry.

Another object of the invention is to prepare polymers in both linear and cross-linked form.

Another object of the invention is to prepare polymers which can be partly or substantially completely hydrolyzed.

Another object of the invention is to provide hydrolyzed polymers which are capable of undergoing reversible cross-linking.

A futher object of the invention is to prepare new boron-containing polymers.

Still another object of the invention is to improve the usefulness of a vinylphenyl boronic ester whereby its field of utility is enhanced.

Other objects of the invention will be apparent to those skilled in the art from the following more detailed description.

Vinylphenyl boronic esters are believed to be new chemical compounds. They are more fully described and are broadly and specifically claimed in the copending application of Arthur K. Hoffmann, Stephen J. Groszos and Walter M. Thomas, Serial No. 682,312, filed concurrently herewith, and any of the vinylphenyl boronic esters that are broadly and specifically disclosed therein can be used in producing the polymers of this invention. They can be prepared from a vinylphenyl boronic acid or a vinylphenyl boroxole (anhydride of a vinylphenyl boronic acid). Vinylphenyl boronic acids and vinylphenyl boroxoles also are believed to be new chemical compounds; and they, too, are more fully described and are broadly and specifically claimed in the aforementioned copending application of Hoffmann et al.

The o-, m- and p-vinylphenyl boronic esters, and mixtures of any two or all three of the aforesaid isomers in any proportions, can be prepared from the corresponding boronic acid or boroxole by techniques which, in general, are essentially the same as those commonly employed in preparing esters of other polymerizable organic or organic-metallic, monomeric acids and anhydrides. Thus, esters of a vinylphenyl boronic acid (or anhydride thereof) can be prepared by, for example, reacting an alcohol at the boiling temperature of the reaction mass with a vinylphenyl boronic acid or a vinylphenyl boroxole until the desired degree of esterification has been effected, more particularly until water no longer is evolved. After removing any unreacted alcohol, the formed ester, e.g., the monohydric alcohol diester or the polyhydric (e.g., di-, tri-, tetra- and pentahydric, etc.) alcohol ester of a vinylphenyl boronic acid, or whatever the ester may be that is being prepared, can be isolated from the reaction mass, if desired, by any suitable means. For example, the esters which are distillable with decomposition can be isolated by distillation under reduced pressure, using fractional distillation if and when necessary or desirable.

In the case of the polyhydric alcohol esters of a vinylphenyl boronic acid or the anhydride thereof, the polyhydric alcohol ester advantageously, in some cases, may be allowed to remain in the reaction mass and used as such, with or without the removal of any excess alcohol, e.g., by distillation, solvent extraction or esterification in situ with a different organic or organo-metallic acid, for instance, phthalic acid or anhydride, maleic acid or anhydride, fumaric acid, succinic acid, adipic acid or other saturated or unsaturated polycarboxylic acid or anhydride; or with a monocarboxylic acid, e.g., acetic, propionic, valeric, oleic, palmitic, stearic, etc.

In making the esters of this invention by direct esterification, or by other alternative techniques, the reaction is preferably effected while the reactants are contained in an inert, organic, liquid medium, e.g., benzene, toluene, ets., thereby to aid in the removal of water in instances where water is evolved as a by-product. In some cases an excess of the alcohol reactant may constitute the organic liquid medium in which the reaction is effected. An inhibitor of polymerization, e.g., ascorbic acid, isoascorbic acid, hydroquinone, pyrogallol, copper in the form of filings or turnings, or other known inhibitors of vinyl-type polymerization reactions, advantageously may be added to the reaction mass either initially, or during a later stage of the process, in order to inhibit or minimize the formation of a homopolymer of the ester of the vinylphenyl boronic acid. An esterification catalyst, e.g., potassium or other alkali-metal carbonate, may sometimes be used advantageously in order to initiate the reaction more quickly.

The symmetrical diesters used in practicing this invention preferably are prepared by direct esterification of a vinylphenyl boronic acid or the corresponding boroxole with an alcohol corresponding to the ester desired, usually at a temperature not exceeding substantially about 200° C. In the preparation of the diesters an excess of the alcohol over that theoretically required for reaction with the vinylphenyl boronic acid or anhydride to form the diester ordinarily is employed, but equivalent molar proportions may be used, if desired; that is, two moles of the monohydric alcohol per mole of the vinylphenyl boronic acid or six moles of the monohydric alcohol per mole of the vinylphenyl boroxole.

Examples of monohydric alcohols that can be used in making the vinylphenyl boronic esters employed in this invention are the methyl, ethyl, propyl, isopropyl, n-butyl, isobutyl, sec.-butyl, tert.-butyl alcohols, and the higher members of the homologous series up to and including octadecyl alcohol in the normal and various isomeric forms, and even higher, e.g., those containing as many as, say, 30 carbon atoms in the molecule; benzyl, phenylethyl and other aralkyl alcohols; the various monohydric cycloaliphatic alcohols, e.g., cyclohexanol, methylcyclohexanol, etc.; the various available (or relatively simple to make) unsaturated monohydric alcohols, e.g., allyl, methallyl, ethallyl, crotyl and cinnamyl alcohols, 3-hydroxy-butene-1, etc., and halogenated (chlorinated, brominated, fluorinated or iodinated) alcohols corresponding to those just mentioned by way of example, e.g., 1-chloroallyl alcohol, 2-chloroallyl alcohol, 1-bromoallyl alcohol, 2-bromoallyl alcohol, 1,2-dichloroallyl alcohol, 1,2-dibromoallyl alcohol, 1,2-difluoroallyl alcohol, 2-chloropropanol-1, 3-chloropropanol-1, 3-iodopropanol-1, 2,3-dichloropropanol-1, etc.; the various nuclearly halogenated (chlorinated, brominated, etc.) benzyl alcohols; the various available monohydric nitroalcohols; the various monohydric silanols; and others that will be apparent to those skilled in the art from the foregoing illustrative examples.

Examples of polyhydric alcohols that can be employed either alone or in conjunction with a monohydric alcohol in preparing esters employed in practicing this invention are ethylene glycol, di-, tri- and tetraethylene glycols, propylene glycol, tetramethylene glycol, hexamethylene glycol, octamethylene glycol, decamethylene glycol, dodecamethylene glycol, glycerol, thiodiglycol, pentaerythritol, dipentaerythritol, neopentyl glycol, dineopentyl glycol, trimethylol propane, 1,4-butanediol, 2-butene-1,4-diol, 2-butyne-1,4-diol, 2-ethyl-1,3-hexanediol, pentaethylene glycol, hexaethylene glycol, octaethylene glycol, decaethylene glycol, 2-butyl-1,3-octanediol, 2-ethyl-2-methylol-1-hexanol (2-ethyl-2-butyl-1,3 - propanediol), 6 - methyl - 2,4-heptanediol, polyallyl and polymethallyl alcohols containing an average of at least five primary hydroxyl groups per molecule, dipropylene glycol, dibutylene glycol, dihexylene glycol, di-(2-hydroxyamyl) ether; and halogenated (chlorinated, brominated, fluorinated or iodinated) polyhydric alcohols corresponding to those just mentioned by way of example, e.g., 2-chloro-1,3-hexanediol, 2-bromo-1,3-octanediol, 2,2-dichloro-1,3-propanediol, 2,2-dibromo-1,3-propanediol, 2-fluoro-1,3-hexanediol, 2-iodo-2-butyl-1,3-propanediol, perfluorinated polymeric allyl alcohol containing an average of at least five primary hydroxyl groups per molecule; and others that will be apparent to those skilled in the art from the foregoing illustrative examples.

To the best of our knowledge and belief any monohydric alcohol and any polyhydric alcohol are operative in producing the esters used in practicing the present invention. Advantageously the alcohol employed is one in which the hydroxyl group or groups are the only substituents thereof which are reactive in an esterification reaction.

The objects of the invention are accomplished, in general, by polymerizing a vinylphenyl boronic ester alone or while admixed with one or more (e.g., two, three, five or any desired number of) other unsaturated substances which are copolymerizable therewith, examples of which have been given hereinbefore. The homopolymer or copolymer advantageously is produced, for instance, by polymerizing a vinylphenyl boronic ester or a mixture thereof with one or more other unsaturated materials, under anhydrous conditions and with the aid of a polymerization catalyst or catalysts.

Examples of monomers containing a $CH_2=C<$ grouping that can be copolymerized with a vinylphenyl boronic ester, which are different therefrom, and which can be polymerized either singly or with a plurality (two, three, four or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the vinyl, isopropenyl, allyl, methallyl, crotyl, 1-chloroallyl, 2-chloroallyl, cinnamyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e.g., methacrylic, ethacrylic, propacrylic, etc., and arylacrylic, e.g., phenylacrylic, etc.), crotonic, oxalic, malonic, succinic, glutaric, adipic, pimelic, suberic, azelaic, sebacic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e.g., styrene, o-, m- and p-chlorostyrenes, -bromostyrenes, -fluorostyrenes, -methylstyrenes, -ethylstyrenes, -cyanostyrenes, the various poly-substituted styrenes such, for example, as the various di-, tri- and tetra-chlorostyrenes, -bromostyrenes, -fluorostyrenes, -methylstyrenes, -ethylstyrenes, -cyanostyrenes, etc., vinylnaphthalenes, vinylcyclohexanes, vinylfuranes, vinylpyridines, vinyldibenzofuran, divinylbenzenes, trivinylbenzenes, allylbenzenes, diallylbenzens, N-vinyl carbazol, the various allyl cyanostyrenes, the various alpha-substituted styrenes and alpha-substituted ring-substituted styrenes, e.g., alphamethyl styrene, alpha-methyl-para-methyl styrene, etc.; unsaturated ethers, e.g., ethyl vinyl ether, diallyl ether, ethyl methallyl ether, etc.; unsaturated acids and anhydrides, e.g., acrylic and methacrylic acids, maleic anhydride, etc.; unsaturated amides, for instance N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, ec.; butadienes, e.g., 1,3-butadiene, 2-chlorobutadine, etc.; unsaturated polyhydric alcohol (e.g., butenediol, etc.) esters of saturated and unsaturated, aliphatic and aromatic, monobasic and polybasic acids, illustrative examples of which appear above; unsaturated glycidyl esters such as glycidyl acrylate, glycidyl methacrylate, glycidyl itaconate, glycidyl allyl phthalate, etc.

Other examples of monomers that can be copolymerized with a vinylphenyl boronic ester to produce our new copolymer compositions are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide, other comonomers being added if needed in order to improve the compatibility and copolymerization characteristics of the mixed monomers.

Other and more specific examples of monomeric materials which can be mixed or blended with a vinylphenyl boronic ester, and the resulting homogeneous or substantially homogeneous, polymerizable composition then polymerized, as hereinafter more fully described, to yield new and valuable copolymer compositions are the allyl compounds, especially those which have a boiling point of at least about 60° C. Of the monomeric materials which can be used the allyl esters form a large class, all of which are suitable. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

More specific examples of allyl compounds that can be copolymerized with a vinylphenyl boronic ester are one or another or a plurality of the following (or a mixture thereof with another comonomer): allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl azelate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl phosphate, trimethallyl phosphate, tetrallyl silicate, hexallyl disiloxane, etc. Other examples of allyl compounds that may be employed are given in, for example, Kropa U.S. Patent No. 2,510,503, dated June 6, 1950.

Among the comonomers which are preferred for use in carrying our invention into effect are the vinyl compounds, including the vinyl aromatic compounds, more particularly the vinyl aromatic hydrocarbons (e.g., styrene, the various dialkyl styrenes, etc.), and the vinyl aliphatic compounds, e.g., acrylonitrile, acrylamide, etc., and other compounds containing a $CH_2=C<$ grouping, e.g., the various substituted acrylonitriles (e.g., methacrylonitrile, ethacrylonitrile, phenylacrylonitrile, etc.), the various substituted acrylamides, (e.g., methacrylamide, ethacrylamide, the various N-substituted acrylamides and alkacrylamides, for instance N-methylol acrylamide, N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, etc.), vinyl esters, e.g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e.g., methacrylic acid, ethacrylic acid, phenylacrylic acid, etc.), more particularly the alkyl esters of an acrylic acid, e.g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the alkyl grouping, examples of which are given above, as well as other vinyl aromatic and vinyl aliphatic compounds, and other compounds containing a $CH_2=C<$ grouping.

An unsaturated alkyd resin or a plurality of such resins also may constitute the unsaturated material which is copolymerized with one or more vinylphenyl boronic esters to produce new and valuable copolymer compositions. Such resins are reaction products of a polyhydric alcohol and an unsaturated polycarboxylic acid or anhydride, and they contain a plurality of polymerizably reactive alpha,beta-enal groups, that is, the grouping

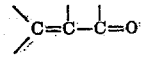

The unsaturated alkyd resins can be produced by various means, for example by the esterification of an unsaturated alpha,beta-polycarboxylic acid of the aliphatic series, more particularly an alpha,beta-unsaturated polycarboxylic acid, with a polyhydric alcohol, e.g., a glycol. The unsaturated alkyd resin employed as a co-reactant with a vinylphenyl boronic ester is preferably one having an acid number not greater than 50, although in some cases resins having an acid number as high as 100 may be employed. The term "unsaturated alkyd resin" as used herein does not include within its meaning the conventional drying oil or drying oil acid-modified alkyd resins in the preparation of which an aromatic or a saturated aliphatic polycarboxylic acid or anhydride is used.

Illustrative examples of unsaturated alkyd resins that may be employed are those produced by reaction of the following ingredients: ethylene glycol and maleic anhydride; glycerine and maleic anhydride; diethylene glycol, maleic anhydride and phthalic anhydride; diethylene glycol and itaconic acid; ethylene glycol, maleic anhydride and succinic acid; ethylene glycol, maleic anhydride and tetrafluorosuccinic acid; ethylene glycol, itaconic acid and phthalic anhydride; diethylene glycol, maleic anhydride and tung oil acids; ethylene glycol, maleic anhydride, linseed oil acids and phthalic anhydride; diethylene glycol and maleic anhydride; ethylene glycol, maleic anhydride and stearic acid; diethylene glycol, maleic anhydride and decyl alcohol; ethylene glycol, maleic anhydride, octyl alcohol and acetic anhydride; diethylene glycol, fumaric acid, tetrahydroabietyl alcohol and linseed oil fatty acids; alpha-propylene glycol and maleic anhydride; diethylene glycol, fumaric acid and benzyl alcohol; diethylene glycol, fumaric acid and tetrahydroabietyl alcohol; ethylene glycol, fumaric acid and omega-hydroxydecanoic acid; diethylene glycol, fumaric acid and linseed oil fatty acid monoglycerides; etc. Reference is made to the following patents for more detailed information regarding the ingredients, the preparation, and additional examples of modified and unmodified unsaturated alkyd resins that may be copolymerized with a vinylphenyl boronic ester to yield new synthetic compositions having a wide variety of commercial applications: 2,409,633; 2,443,740; 2,443,741; 2,485,294; and 2,510,503.

Mixtures of any of the aforementioned polymerizable materials may be copolymerized with a vinylphenyl boronic ester. For example, we may copolymerize a vinylphenyl boronic ester with an unsaturated alkyd resin alone, e.g., diethylene glycol maleate, etc., or, also alone, a compound containing a $CH_2=C<$ grouping (which compound is different from a vinylphenyl boronic ester), e.g., styrene diallyl succinate, triallyl cyanurate, etc., or a mixture of such a resin and a compound containing a $CH_2=C<$ grouping. Mixtures of different unsaturated alkyd resins and of different compounds containing a $CH_2=C<$ grouping sometimes may be employed advantageously in making a copolymer thereof with a vinylphenyl boronic ester.

Graft polymers of a vinylphenyl boronic ester and a co-reactable substance are embraced by the term "copolymer" as used broadly herein and in the appended claims with reference to a vinylphenyl boronic ester. The vinylphenyl boronic ester may be grafted, for instance with the aid of ionizing radiation, to a polymer of a different polymerizable substance, e.g., polystyrenes, polyacrylonitriles or polymers of other monomers that contain a $CH_2=C<$ grouping, numerous examples of which have been given hereinbefore; or the base to which the graft is attached may be a polymer of a vinylphenyl boronic ester to which is grafted a co-reactive unsaturated material such as styrene, acrylonitrile or other monomer containing a $CH_2=C<$ grouping, including any of those mentioned hereinbefore by way of example.

In the production of copolymers, the vinylphenyl boronic ester generally constitutes at least about 3% by weight of the mixture of copolymerizable materials, e.g., from 5% or 10% to 90% or 95%, or even as high as 98% or 99% by weight of the aforesaid mixture. The smaller proportions are generally employed when it is desired to impart a specific property or characteristic to the copolymer. For example, in the case of the acrylonitrile copolymers, improved dye-receptivity is imparted to the copolymer and to fibers produced therefrom by copolymerizing ingredients including acrylonitrile and a vinylphenyl boronic ester in proportions such that the initially-produced copolymer contains, by weight, from about 1% to about 10% by weight of vinylphenyl boronic ester combined in the copolymer molecule.

Any suitable means may be employed in effecting polymerization of a vinylphenyl boronic ester alone or admixed with one or more other unsaturated substances which are copolymerizable therewith. The vinylphenyl boronic esters are capable of being polymerized with varying degrees of ease by, for example, a cationic initiator or catalyst (e.g., boron trifluoride-ethyl etherate), or by an anionic initiator or catalyst (e.g., a sodium-naphthalene complex, metallic sodium, etc.), or by a free-radical initiator or catalyst (e.g., benzoyl peroxide or other organic peroxy compound, or an azo catalyst such, for instance, as alpha,alpha'-azodiisobutyronitrile).

Additional examples of peroxy type of free-radical catalysts are the various organic peroxy catalysts, illustrative examples of which latter are: the dialkyl peroxides, e.g., dipropyl peroxide, dibutyl peroxide, dilauryl peroxide, dioleyl peroxide, distearyl peroxide, di-(tert.-butyl) peroxide and di-(tert.-amyl) peroxide; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; urea peroxide; the various percarboxylic acids; the various percarbonates, persulfates, perborates, etc.; and others that will be apparent to those skilled in the art from the foregoing examples.

Additional examples of azo type of free-radical catalysts include the following:

Dimethyl alpha,alpha'-azodiisobutyrate
alpha,alpha'-Azobis (alpha-methylbutyronitrile)
alpha,alpha'-Azobis (alpha-ethylbutyronitrile)
alpha,alpha'-Azobis (alpha,gamma - dimethyl - valeronitrile)
alpha,alpha'-Azobis (alpha-methylvaleronitrile)
alpha,alpha'-Azobis (alpha-methylcapronitrile)
alpha,alpha'-Azobis (alpha-n-butylcapronitrile)
alpha,alpha'-Azobis (alpha-isobutyl-gamma-methylvaleronitrile)
alpha,alpha'-Azobis (alpha-isopropyl-beta-methylbutyronitrile)
alpha,alpha'-Azobis (alpha,beta-dimethylbutyronitrile)
alpha,alpha'-Azobis (alpha,gamma-dimethylcapronitrile)
1,1'-azodicyclopentanecarbonitrile Reference is made to Hunt U.S. Patent No. 2,471,959, dated May 31, 1949, for additional examples and for a generic description of compounds of this class.

The chosen free-radical catalyst should be soluble in a component or components of the reaction mass, e.g., the anhydrous solvent or diluent employed (if any), the vinylphenyl boronic ester or, if used, the monomer chosen for copolymerization with the vinylphenyl boronic ester.

In addition to free-radical catalysts of the above types or kinds, ionizing radiations, ultraviolet light, etc., may also be used to initiate polymerization.

Additional examples of ionic catalysts that can be used are p-toluene sulfonic acid, sulfuric acid, phosphoric acid, aluminum chloride, stannic chloride, titanium tetrachloride, boron trifluoride and other Lewis-type catalysts, more particularly Friedel-Craft catalysts; and the various anionic catalysts, e.g., metallic potassium, a potassium-naphthalene complex, amylsodium, amylpotassium, etc.

The monomeric vinylphenyl boronic ester or mixture of copolymerizable ingredients can be polymerized in anhydrous heterogeneous systems or in anhydrous solutions to yield a homopolymer or a copolymer. Various inert organic solvents or diluents also may be employed, the choice depending upon the particular comonomer and catalyst used and among which may be mentioned: benzene, toluene, xylene, dioxane, ethers (e.g., dibutyl ether), esters (e.g., butyl acetate), chlorobenzene, chloroform, carbon tetrachloride, methylene chloride, ethylene dichloride, ketones (e.g., methyl ethyl ketone), tertiary alcohols, for instance tertiary-butyl alcohol, tertiary-amyl alcohol, tertiary-hexyl alcohol, as well as others. When the reaction is effected in anhydrous solution state, a temperature at or approaching the boiling temperature of the solution may be used if desired. The homopolymer or copolymer is then separated from the anhydrous liquid medium (solvent or diluent) in which polymerization was effected by any suitable means, e.g., by filtration, centrifuging, solvent extraction, evaporation of the solvent or diluent, etc.

The polymerization can be effected continuously, semi-continuously or by a batch operation. Bulk or mass polymerization technique can be used; or polymerization can be effected in an anhydrous solvent which is capable of dissolving the polymerizable substance and in which the latter is preferably inert; or in a liquid medium in which the polymerizable substance is soluble but the homopolymer or copolymer is insoluble. The polymerization can be effected at atmospheric or at superatmospheric pressures, as desired or as conditions may require.

As indicated hereinbefore, a catalyst or catalytic influence is required in order to initiate the polymerization or if polymerization is to be effected in a reasonable or practical period of time. The concentration of catalyst employed varies considerably. Thus, depending upon the particular catalyst used and the kind and amount (if any) of copolymerizable substance that is being copolymerized with the vinylphenyl boronic ester, it may range from, for example, about 0.5 part or 1 part by weight of catalyst per thousand parts by weight of the polymerizable substance to a molar ratio of catalyst/polymerizable substance equal to or greater than 1.

The temperature of polymerization of the polymerizable substance or composition, at atmospheric or super-atmospheric pressure, and under a catalytic influence such as that provided by an added polymerization initiator, can be varied over a wide range up to and including or slightly above the boiling point (at atmospheric pressure) of the mass (or of the lowest boiling component thereof), but should be below the decomposition temperature of the monomeric material or materials (i.e., the polymerizable composition). In most cases the polymerization temperature will be within the range of 15° C. to 150° C., more particularly within the range of 20°–30° C. (ordinary room temperature) to about 130° C., depending upon the particular polymerizable composition being polymerized, the particular catalyst used, the rapidity of polymerization wanted, and other influencing factors. With certain ionic catalysts, e.g., gaseous $BF_3$, a boron trifluoride-ethyl ether complex, concentrated sulfuric acid, anhydrous aluminum chloride, etc., a substantially lower polymerization temperature often advantageously may be used, e.g., temperatures ranging between −80° C. and 0° C. or +10° C. At the lower temperatures below the solidification point of the monomeric vinylphenyl boronic ester or of the mixture thereof with one or more other polymerizable substances, polymerization is usually effected while the polymerizable composition is dissolved or dispersed in an anhydrous solvent or dispersion medium which is liquid at the polymerization temperature. The polymeric material is then separated from the anhydrous liquid medium in which polymerization was effected by any suitable means, for example by techniques such as those mentioned hereinbefore for purpose of illustration.

In order that those skilled in the art may better understand how the present invention can be carried into effect, the following examples are given by way of illustration and not by way of limitation. All parts and percentages are by weight unless otherwise stated.

EXAMPLE 1

(A) *Preparation of iminodiethyl(p-vinylphenyl)boronate* p-Vinylphenyl boronic acid, 5.0 g. (0.034 mole), is subjected to azeotropic distillation in 200 ml. of toluene containing 3.6 g. (0.034 mole) diethanolamine for 2 hours. At the end of this time, the reaction mass is cooled and filtered. Recrystallization of the colorless product from acetone yields 7.3 g. (99% of theory) of long, glistening needles of iminodiethyl(p-vinylphenyl)-boronate. M.P. 236–237° C., dec.

*Analysis.*—Calc'd for $C_{12}H_{16}O_2NB$: C, 66.39; H, 7.43; N, 6.45; B, 4.98. Found: C, 66.42; H, 7.41; N, 6.44; B, 5.06.

If desired, a polymerization inhibitor can be included with the primary reactants, e.g., from about 0.005 g. to 0.05 g. of hydroquinone, pyrogallol, ascorbic acid, isoascorbic acid and/or other inhibitor of vinyl-type polymerizations.

p-Vinylphenyl boronic acid, as well as the o- and m-isomers (or mixtures of any two or all three of these isomers in any proportions) can be prepared by, for example, hydrating the corresponding vinylphenyl boroxole. The latter can be made by dehydrohalogenating, under anhydrous conditions and while admixed with a base, the corresponding alpha-X-ethylphenyl boroxole. For additional details on methods of preparing vinylphenyl boronic acids and boroxoles, reference is made to the aforementioned copending application of Hoffmann et al., Serial No. 682,312, filed concurrently herewith.

(B) *Homopolymerization of iminodiethyl-(p-vinylphenyl)boronate*

Iminodiethyl(p-vinylphenyl)boronate, 1.0 g., is dissolved in 1 liter of chloroform. To this solution at room temperature (20°–30° C.) is added 0.2 g. of boron trifluoride dissolved in diethyl ether. Polymerization occurs slowly, and after 24 hours a small amount of solid homopolymer precipitates and is removed by filtration and dried.

EXAMPLE 2

Same as in Example 1 (B) with the exception that 1 liter of methylene chloride is used instead of 1 liter of chloroform. The results are the same.

EXAMPLE 3

(A) *Preparation of diallyl(p-vinylphenyl)boronate*

About 15 g. of p-vinylphenyl boronic acid is azeotroped (that is, subjected to azeotropic distillation) in 200 ml. of toluene for 1 hour to form the corresponding boroxole. To the toluene solution is added 225 ml. of freshly distilled allyl alcohol and the solution is refluxed for 1 hour. At the end of this time, the toluene and excess allyl alcohol are removed by distillation at atmospheric pressure, and the residue is distilled in vacuo to obtain diallyl(p-vinylphenyl)boronate as a fraction boiling at 100° C. at 1 mm. pressure.

(Instead of p-vinylphenyl boronic acid one can use o- and/or m-vinylphenyl boronic acid, or a mixture of either or both with p-vinylphenyl boronic acid. With these boronic acids as such or in the form of the corresponding boroxoles, and also with p-vinylphenyl boronic acid or boroxole, one can directly esterify with methallyl alcohol (instead of all or part of the allyl alcohol in the above example) or with any other unsaturated monohydric alcohol, or with furfuryl alcohol, or with any of the other alcohols hereinbefore and hereinafter mentioned by way of example.)

(B) *Polymerization and copolymerization of diallyl(p-vinylphenyl)boronate*

Several different methods of polymerizing this ester are illustrated below:

(a) Ten (10) g. of the ester and 10.7 mg. of alpha,-alpha'-azodiisobutyronitrile are mixed together, and then heated for 12 hours at 70° C. The resulting reaction mass comprises a glassy, linear homopolymer which does not melt below 300° C. In common with other polymeric esters of a vinylphenyl boronic acid, this polymeric allyl ester also is soluble in butyl acetate without hydrolysis and in aqueous tert.-butanol and aqueous sodium hydroxide with hydrolysis to poly-(p-vinylphenyl) boronic acid.

(b) Ten (10) g. of the monomeric diallyl ester admixed with 10.0 mg. of di-tert.-butyl peroxide is heated for 1 hour at 135° C. An organic solvent-insoluble homopolymer, M.P. 295° C. with decomposition, is obtained. The insolubility indicates that cross-linking can occur at polymerization temperatures greater than 70° C. under these conditions.

(c) A saturated solution of the homopolymeric diallyl ester of (a), 4.5 g., in butyl acetate is mixed with 0.70 g. of alpha,alpha'-azodiisobutyronitrile for 2½ hours at 80° C. At the end of this time an insoluble polymer precipitates from solution. Although this polymer (M.P. greater than 300° C.) is cross-linked, it is soluble in aqueous sodium hydroxide solution, indicating that cross-linking has occurred through the ester allyl groups. Upon hydrolysis a linear uncross-linked (hence soluble) poly-(p-vinylphenyl) boronic acid is obtained.

(d) A copolymer of diallyl(p-vinylphenyl)-boronate and styrene is prepared as follows:

To 1.93 g. of the monomeric diallyl ester and 1.28 g. of styrene in a nitrogen atmosphere is added 3.2 ml. of anhydrous tetrahydrofurane and about 46 mg. of sodium dispersed in toluene. After 40 minutes at room temperature the reaction mass is poured into methanol. The precipitated copolymer is purified by washing with methanol. Subsequent washing with hot water hydrolyzes the ester groupings. Upon analysis it is found that the dried copolymer comprises 22.1% p-vinylphenyl boronic acid and 77.9% styrene combined in the copolymer molecule.

(e) A copolymer of diallyl(p-vinylphenyl)-boronate and p-cyanostyrene is prepared as follows:

p-Cyanostyrene (1.97 g.) is mixed with 3.8 g. of diallyl(p-vinylphenyl)boronate, and 5.2 mg. of alpha,-alpha'-azodiisobutyronitrile is added. The reaction mixture is heated for 18 hours at 70° C. after having been degassed. The reaction mass comprising a copolymer of the above boronic ester and p-cyanostyrene is washed with toluene, and is found to be insoluble in aqueous tert.-butanol, a solvent in which homopolymeric p-vinylphenyl boronic acid is soluble. This insoluble copolymer has excellent solvent resistance, since it is insoluble in all of the ordinary solvents although it swells in aqueous tertiary-butanol. The insoluble copolymer has a melting point greater than 300° C. although it discolors at 275° C. Upon analysis it is found that it comprises about 60% p-vinylphenyl boronic acid and 40% p-cyanostyrene combined in the copolymer molecule.

EXAMPLE 4

(A) *Preparation of di-n-butyl(p-vinylphenyl)boronate* p-Vinylphenyl boronic acid, 15.0 g. (0.10 mole), is azeotroped in 100 ml. of n-butanol for about 3½ hours. The butanol is removed by distillation at atmospheric pressure, followed by vacuum evaporation at 100° C. The residue is distilled under reduced pressure to obtain di-n-butyl(p-vinylphenyl)boronate as a fraction boiling at 130° C. at 1 mm. pressure. The yield of ester is 14.4 g., which corresponds to about 55% of the theoretical.

(B) *Polymerization and copolymerization of di-n-butyl (p-vinylphenyl)boronate*

(a) One (1.0) g. of di-n-butyl(p-vinylphenyl)boronate is dissolved in 2 ml. of anhydrous tetrahydrofurane. The solution is maintained in a nitrogen atmosphere and 23 mg. of sodium dispersed in toluene is added. Rapid polymerization occurs, and at the end of ½ hour the solid homopolymer that forms is treated with 3 ml. of n-butanol, filtered, and dried in vacuo at 50° C.

(b) To 0.5 g. naphthalene dissolved in 3 ml. of anhydrous tetrahydrofurane in a flask sealed with a serum stopper is added 100 mg. of sodium as a toluene dispersion. After the dark-green complex has formed, it is added by means of a hypodermic syringe to 2.0 g. of di-n-butyl(p-vinylphenyl)boronate in 2.0 ml. of tetrahydrofurane kept under a nitrogen atmosphere at −80° C. The color of the solution changes from a dark green to red. The solution is allowed to warm slowly to 20° C. After 10 hours at 20° C., the reaction vessel is opened to the air and the homopolymer that has been formed is washed with additional tetrahydrofurane and dried in vacuo.

(c) Six and one-half (6½) g. of di-n-butyl(p-vinylphenyl)boronate is treated with 0.325 g. of di-tert.-butyl peroxide, and the resulting mixture is heated at 130° C. for 16 hours. The resulting homopolymer may be dissolved in butyl acetate and freeze-dried. A clear, brittle, glass-like solid polymer results. It has a softening point of 260°–270° C. but does not melt below 300° C.

(d) A copolymer of di-n-butyl(p-vinylphenyl)boronate and methyl methacrylate is prepared as follows:

To 3.7025 g. of the aforesaid boronate is added 1.3595 g. of methyl methacrylate and 5.3 mg. of alpha,alpha'-azodiisobutyronitrile. The reaction mixture is kept at 80° C. for 19 hours. At the end of this time the formed copolymer is dissolved in 25% aqueous tertiary-butanol, precipitated with water (thereby hydrolyzing the ester groups), and dried. The hydrolyzed copolymer is found upon analysis to contain about 20% methyl methacrylate and about 80% p-vinylphenyl boronic acid, and its melting point is greater than 300° C. The hydrolyzed copolymer is soluble in ethylene carbonate, a solvent in which homopolymeric p-vinylphenyl boronic acid is insoluble.

Instead of methyl methacrylate there can be used one or more other comonomers, for instance one or more other esters of acrylic and/or methacrylic acid, e.g., methyl acrylate, propyl acrylate, isopropyl acrylate, n-butyl acrylate, isobutyl acrylate, sec.-butyl acrylate, tert.-butyl acrylate, amyl acrylate, hexyl acrylate, propenyl acrylate, cyclohexyl acrylate, phenyl acrylate, benzyl acrylate, etc., and/or the corresponding methacrylic esters, thereby to obtain copolymer compositions of varying properties.

(e) A copolymer of di-n-butyl(p-vinylphenyl)boronate and vinyl acetate is prepared as follows:

To 3.716 g. of the above-mentioned boronate is added 1.2446 g. of vinyl acetate and 10.9 mg. of alpha,alpha'-azodiisobutyronitrile. After 19 hours at 80° C. the reaction mass is evaporated in vacuo to dryness at 110° C./1 mm. to remove excess vinyl acetate monomer. The residual copolymer is dissolved in aqueous tert.-butanol and precipitated with water, whereby the ester groups are hydrolyzed. Analysis shows that the hydrolyzed copolymer contains about 16% vinyl acetate and about 84% p-vinylphenyl boronic acid. Its melting point is greater than 300° C.

(f) A copolymer of di-n-butyl(p-vinylphenyl)boronate and acrylonitrile is prepared as follows:

A mixture of 4.0230 g. of the aforesaid boronate and 0.8035 g. of acrylonitrile containing 5.6 mg. alpha,alpha'-azodiisobutyronitrile is kept for 40 minutes at 80° C. The reaction mass comprising the formed copolymer is almost solid, and is washed with dimethylformamide prior to its solution in aqueous tertiary-butanol, which latter solvent mixture hydrolyzes the ester groups. Evaporation of a portion of the tertiary-butanol solution of the copolymer on a glass surface leaves a tough, clear film adhering strongly to the glass. The hydrolyzed copolymer does not melt below 300° C., and consists of about 31% acrylonitrile and about 69% p-vinylphenyl boronic acid.

(g) A copolymer of di-n-butyl(p-vinylphenyl)boronate and styrene is prepared as follows:

To a solution of 1.2051 g. of styrene in 2.8414 g. of di-n-butyl(p-vinylphenyl)boronate is added 80 mg. of alpha,alpha'-azodiisobutyronitrile. The reaction mixture is degassed and maintained for 24 hours at 70° C., after which it is dissolved in toluene and poured into water, whereby ester groups of the copolymer are hydrolyzed. A tacky precipitate forms in the water layer and the toluene and water are decanted. The copolymer is dissolved in aqueous tertiary-butanol and reprecipitated from water, thereby hydrolyzing any remaining unhydrolyzed ester groups. The hydrolyzed polymer is soluble in aqueous sodium hydroxide, does not melt below 300° C. but begins to yellow and decompose at 260° C. The hydrolyzed copolymer (obtained after reprecipitation in water) is composed of about 48% p-vinylphenyl boronic acid and about 52% styrene.

EXAMPLE 5

(A) *Preparation of dibenzyl(p-vinylphenyl)boronate* p-Vinylphenyl boronic acid (8.25 g.) and 11.9 g. of benzyl alcohol in toluene are subjected to azeotropic distillation for 2 hours. The toluene is distilled off and the pure ester, dibenzyl(p-vinylphenyl)boronate, is obtained as a viscous liquid by molecular distillation at 1 mm. pressure.

(B) *Homopolymerization of dibenzyl(p-vinylphenyl)boronate*

In the absence of a polymerization inhibitor, the freshly prepared ester of (A) slowly polymerizes at room temperature (20°–30° C.) to a liquid of increasingly greater viscosity; more rapidly at an elevated temperature, e.g., 40°–100° C.; and still more rapidly at room temperature or at an elevated temperature when a small amount, e.g., from 0.01% to 2% of a polymerization catalyst such as a peroxy or other free-radical catalyst is added thereto.

This ester also can be homopolymerized and copolymerized as described under Examples 1 to 4, inclusive, with reference to the esters of those examples.

EXAMPLE 6

*Preparation and homopolymerization of di-(3-chloropropyl)(p-vinylphenyl)boronate* p-Vinylphenyl boronic acid (29.8 g.; 0.201 mole) and 39.3 g. (0.416 mole) of 3-chloropropanol-1 in toluene are subjected to azeotropic distillation. The toluene is removed by distillation at atmospheric pressure and di-(3-chloropropyl)(p-vinylphenyl)boronate is collected as the fraction boiling at 138° C. at 1 mm. pressure.

The di-(3-chloropropyl)(p-vinylphenyl)boronate shows essentially the same homopolymerization and copolymerization characteristics as, for example, the dibenzyl(p-vinylphenyl)boronate of Example 5. It can be allowed or caused to homopolymerize as described under Example 5 with reference to the ester of that example. It also can be homopolymerized and copolymerized as described under Examples 1 to 4, inclusive, with reference to the esters of those examples; or the monomeric esters of Examples 5 and 6 can be copolymerized with each other in any proportions, or either or both can be copolymerized in any proportions with any one or more of the monomeric esters of Examples 1–4.

EXAMPLE 7

(A) *Preparation of diphenyl(p-vinylphenyl)boronate*

A round-bottomed flask is fitted with a heating mantle, a condenser and a Dean and Stark trap to remove water of reaction. The flask is charged with 18.8 parts of dry phenol, 14.8 parts of p-vinylphenyl boronic acid and 100 parts of dry toluene. The mixture is heated for 12 hours under reflux, water of reaction being retained in the trap. At this point the odor of phenol has disappeared and infrared analysis indicates the presence of B—O—C linkages. Due to ease of hydrolysis or (on long heating) to partial conversion to the corresponding boroxole, the crude product comprising diphenyl(p-vinylphenyl)boronate is not isolated but is used directly in toluene solution.

(B) *Copolymerization of diphenyl(p-vinylphenyl)boronate*

Into an ampoule are placed 4.5 parts of the toluene solution of boronic ester prepared under (A), containing 1.0 g. (0.0033 mole) of diphenyl(p-vinylphenyl)boronate and 500 mg. (0.0048 mole) of styrene. Five (5) mg. of alpha,alpha'-azodiisobutyronitrile is then added. The reagents, up to this point, are handled in an atmosphere of dry nitrogen. The solution is degassed, and the ampoule sealed. It is then heated at 80° C. for 10 hours. At the end of this time, the ampoule is cooled and fractured. The toluene is removed from the reaction mass by vacuum evaporation first at 50° C. and finally at 100° C. The reaction mass comprising a copolymer of styrene and diphenyl(p-vinylphenyl)boronate is hydrolyzed by dissolving it in a minimum amount of aqueous tert.-butanol. The hydrolyzed copolymer is isolated by precipitating it from the aqueous butanolic solution with water. The copolymer is then dried at 100° C. in vacuo, powdered, washed several times with hot water and re-dried. Finally, it is washed with several portions of toluene, prior to final drying.

EXAMPLE 8

Thirty (30) parts of ethylene glycol fumarate sebacate (4:3:1 molar ratio) are mixed with 5 parts of di-n-butyl-(p-vinylphenyl)boronate and 5 parts of styrene. To 12 parts of the resulting mixture are added 8 parts of wood flour filler and 2 parts of benzoyl peroxide containing 50% inactive filler (triphenyl phosphate). The resulting mixture is compacted by passage through cold rolls and disintegrated, and this composition then placed in a disk mold preheated to 140° C. and left there under a pressure of about 5000 pounds per square inch for about 20 minutes. The resulting molding is hard and well-cured.

EXAMPLE 9

A uniform mixture of 25 parts of ethylene glycol fumarate sebacate (4:3:1 molar ratio), 0.5 part of dibenzyl(p-vinylphenyl)boronate and 9.5 parts of styrene containing 0.4 part of benzoyl peroxide is spread evenly between five plies of ECC–11–112 Fiberglas cloth and the combination is held under slight pressure in a Carver press for about 40 minutes at about 150° C. The resinous copolymer component of the impregnated Fiberglas cloth becomes hard and the panel stiff.

EXAMPLE 10

The resin mixture of Example 9 is spread evenly between six plies of No. 720 paper, and the combination is subjected to the same curing conditions as the Fiberglas laminate of Example 9. The resulting panel is stiff, and the paper laminate is well-cured.

EXAMPLE 11

Sixty-seven (67) parts of diethylene glycol fumarate sebacate (6:5:1 molar ratio), 5.0 parts of diallyl(o-vinylphenyl)boronate, 28 parts of diallyl phthalate, 7 parts of paraformaldehyde and 0.5 part of benzoyl peroxide containing 50% inactive filler (triphenyl phosphate) are thoroughly mixed together in a suitable vessel and then heated at 100° C. A vigorous reaction occurs, accompanied by evolution of gas. As the mass polymerizes and sets, it undergoes about a two-fold expansion and the cured mass is porous.

Instead of the particular monohydric alcohols (monohydroxy compounds) employed in the above illustrative examples of the preparation of esters used in making the polymers of this invention, one can use any other such alcohol of which numerous examples have been given hereinbefore. Additional examples of monohydroxy compounds that can be employed in making the polymerizable esters for use in practicing the present invention are the following:

Ethylene glycol monomethyl ether
Ethylene glycol monoethyl ether
Ethylene glycol monopropyl ether
Ethylene glycol monobutyl ether
Ethylene glycol monophenyl ether
Ethylene glycol monoethyl thioether
Diethylene glycol monomethyl ether
Diethylene glycol monoethyl ether
Diethylene glycol monobutyl ether
Ethylene chlorohydrin
Ethylene bromohydrin
Ethylene cyanohydrin
Ethylene glycol monoacetates
Ethylene glycol monopropionate
Ethylene glycol monobenzoate
Diethylene glycol monoacetate
Ethylene glycol monoallyl ether
Ethylene glycol monomethallyl ether
Beta-nitroethanol
Beta-dimethylaminoethanol
Hydroxy acetone
Methyl beta-hydroxyethyl ketone
Ethyl hydracrylic ester
2-methoxy-1-propanol
2-ethoxy-1-propanol
2-butoxy-1-propanol
2-bromo-1-propanol
1-bromo-2-propanol
Trimethylene glycol monomethyl ether
Gamma-chloro-1-propanol
2-nitro-2-methyl-1-propanol Likewise, in place of the particular vinylphenyl boronic acid employed in making the ester shown in the individual example, one can use any other isomer or mixtures thereof in any proportions, or any isomer of a vinylphenyl boroxole or mixtures thereof in any proportions.

EXAMPLE 12

A glyceryl p-vinylphenyl boronate is prepared as follows:

To a reaction vessel provided with means for the continuous withdrawal of water of condensation are charged 581 parts of glycerol, 374 parts of p-vinylphenyl boroxole and 2 parts of hydroquinone as a polymerization inhibitor. The vessel is flushed with nitrogen gas prior to charging the reaction vessel, and the reaction is carried out in an atmosphere of nitrogen.

The reaction mixture is heated with the discharge of condensation water to 215° C. It is then further heated at 215°–225° C. until no more water is evolved and for about ½ to 1 hour thereafter. The resulting glyceryl ester is a viscous resin.

Instead of 374 parts of p-vinylphenyl boroxole in the above formulation one can use about 428 parts of p-vinylphenyl boronic acid and obtain similar results. Any or all of the isomers of vinylphenyl boroxole (or boronic acid) can be used in place of the particular isomer used in making the ester employed in this example.

A uniform mixture of 20 parts of ethylene glycol fumarate sebacate (4:3:1 molar ratio), 5 parts of the above glyceryl p-vinylphenyl boronate and 10 parts of styrene containing 0.4 part of benzoyl peroxide is spread evenly between five plies of ECC–11-112 Fiberglas cloth and the combination is held under slight pressure in a Carver press for about 35 minutes at about 155° C. The resinous copolymer component of the impregnated Fiberglas cloth becomes hard and the panel stiff.

EXAMPLE 13

A p-vinylphenyl boronic ester of ethylene glycol is prepared as follows:

One hundred and twenty-four (124) parts of ethylene glycol and 141 parts of p-vinylphenyl boronic acid are heated together under a nitrogen atmosphere and at a slowly rising temperature for 3 hours to 200° C. under conditions allowing for the discharge of water. It is then held at this temperature for about 2 more hours, or until no more water is being evolved and for about 15 to 45 minutes thereafter. The resulting ester is a viscous liquid.

Twenty (20) parts of ethylene glycol fumarate sebacate (4:3:1 molar ratio) are mixed with 10 parts of styrene and 10 parts of the above p-vinylphenyl boronic ester of ethylene glycol. To 12 parts of the resulting mixture are added 8 parts of wood flour filler and 2 parts of benzoyl peroxide containing 50% inactive filler (triphenyl phosphate). The resulting mixture is compacted by passage through cold rolls and disintegrated, and this composition then placed in a disk mold preheated to 140° C. and left there under a pressure of about 5000 pounds per square inch for about 25 minutes. The resulting molding is hard and well-cured.

It will be understood, of course, by those skilled in the art that our invention is not limited to the specific ingredients named in the above illustrative examples nor to the particular proportions and methods of polymerization and copolymerization mentioned therein. For example, in place of the particular ester of the particular isomer of vinylphenyl boronic acid (or anhydride) specified in the individual example, we may use any other ester of any other isomer of said acid (or mixtures thereof in any proportions), and wherein are utilized any of the ester-forming reactants hereinbefore mentioned by way of example. Also, in place of all or part of the particular co-reactant named in the individual example one can use other compounds containing a $CH_2=C<$ grouping and/or an unsaturated alkyd resin, numerous examples of which have been given hereinbefore.

The polymerization products (polymers and copolymers) of this invention have a wide variety of applications. For instance, with or without a filler or other additive, numerous examples of which have been given hereinbefore, they may be used as molding compositions (or as components of molding compositions) from which molded articles are produced by molding the composition under heat and pressure, e.g., at temperatures of the order of 120° to 200° C. and under pressures ranging between 1000 and 10,000 pounds per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable (including incompletely polymerized) compositions used in producing the polymers of our invention also can be used in the production of castings; as sizing agents; as adhesives, for instance as binders for paper, glass, wood, rubber, etc., or in the production of optical devices containing a plurality of elements, examples of which are compound lenses, compound prisms, Nicol prisms, etc.; in the treatment of paper or paper stock, textile fibers or fabrics, leather, etc.; and for various other purposes including those mentioned in some of the specific examples, and in the portion of this specification prior to the examples. The polymerizable compositions are then polymerized in situ.

We claim:
1. A polymer of an ester of a vinylphenyl boronic acid.
2. A polymer of an ester of p-vinylphenyl boronic acid.
3. A polymer of an iminodiethyl ester of a vinylphenyl boronic acid.
4. A polymer of the iminodiethyl ester of p-vinylphenyl boronic acid.
5. A polymer of a dialkyl ester of a vinylphenyl boronic acid.
6. A polymer of a dialkyl ester of p-vinylphenyl boronic acid.
7. A polymer of a dibutyl ester of a vinylphenyl boronic acid.
8. A polymer of the di-n-butyl ester of p-vinylphenyl boronic acid.
9. A polymer of a dialkenyl ester of a vinylphenyl boronic acid.
10. A polymer of a dialkenyl ester of p-vinylphenyl boronic acid.
11. A polymer of a diallyl ester of a vinylphenyl boronic acid.
12. A polymer of the diallyl ester of p-vinylphenyl boronic acid.
13. A composition comprising a copolymer of copolymerizable ingredients including (1) an ester of a vinylphenyl boronic acid and (2) a compound which is different from the ester of (1), which is copolymerizable therewith and which contains a $CH_2=C<$ grouping.
14. The method which comprises effecting polymerization of a polymerizable composition including an ester of a vinylphenyl boronic acid under anhydrous conditions and with the aid of a catalyst selected from the class consisting of free-radical polymerization catalysts and ionic polymerization catalysts.
15. The method which comprises effecting polymerization of a polymerizable composition including (1) an ester of a vinylphenyl boronic acid and (2) a compound which is different from the ester of (1), which is copolymerizable therewith and which contains a $CH_2=C<$ grouping, said polymerization being effected under anhydrous conditions and with the aid of a catalyst selected from the class consisting of free-radical polymerization catalysts and ionic polymerization catalysts.

References Cited in the file of this patent

UNITED STATES PATENTS

| | | |
|---|---|---|
| 2,402,591 | Lazier et al. | June 25, 1946 |
| 2,413,718 | Lincoln et al. | Jan. 7, 1947 |
| 2,457,603 | Salzberg et al. | Dec. 28, 1948 |

UNITED STATES PATENT OFFICE

CERTIFICATE OF CORRECTION

Patent No. 2,931,788                                  April 5, 1960

Arthur K. Hoffmann et al.

It is hereby certified that error appears in the printed specification of the above numbered patent requiring correction and that the said Letters Patent should read as corrected below.

Column 3, line 69, for "with" read -- without --; column 4, line 13, for "ets.," read -- etc., --; column 5, line 11, for "-1,3-propanediol-" read -- -1,3-propanediol, --; line 71, for "diallylbenzens, N-vinyl carbazol," read -- diallylbenzenes, N-vinyl carbazole, --; column 6, line 9, for "ec.;" read -- etc.; --; line 10, for "chlorobutadine" read -- chlorobutadiene --; column 8, line 5, after "styrene" insert a comma; column 15, line 65, for "monoacetates" read -- monoacetate --.

Signed and sealed this 4th day of October 1960.

(SEAL)
Attest:

KARL H. AXLINE                                      ROBERT C. WATSON
Attesting Officer                              Commissioner of Patents